United States Patent Office 3,332,061
Patented July 18, 1967

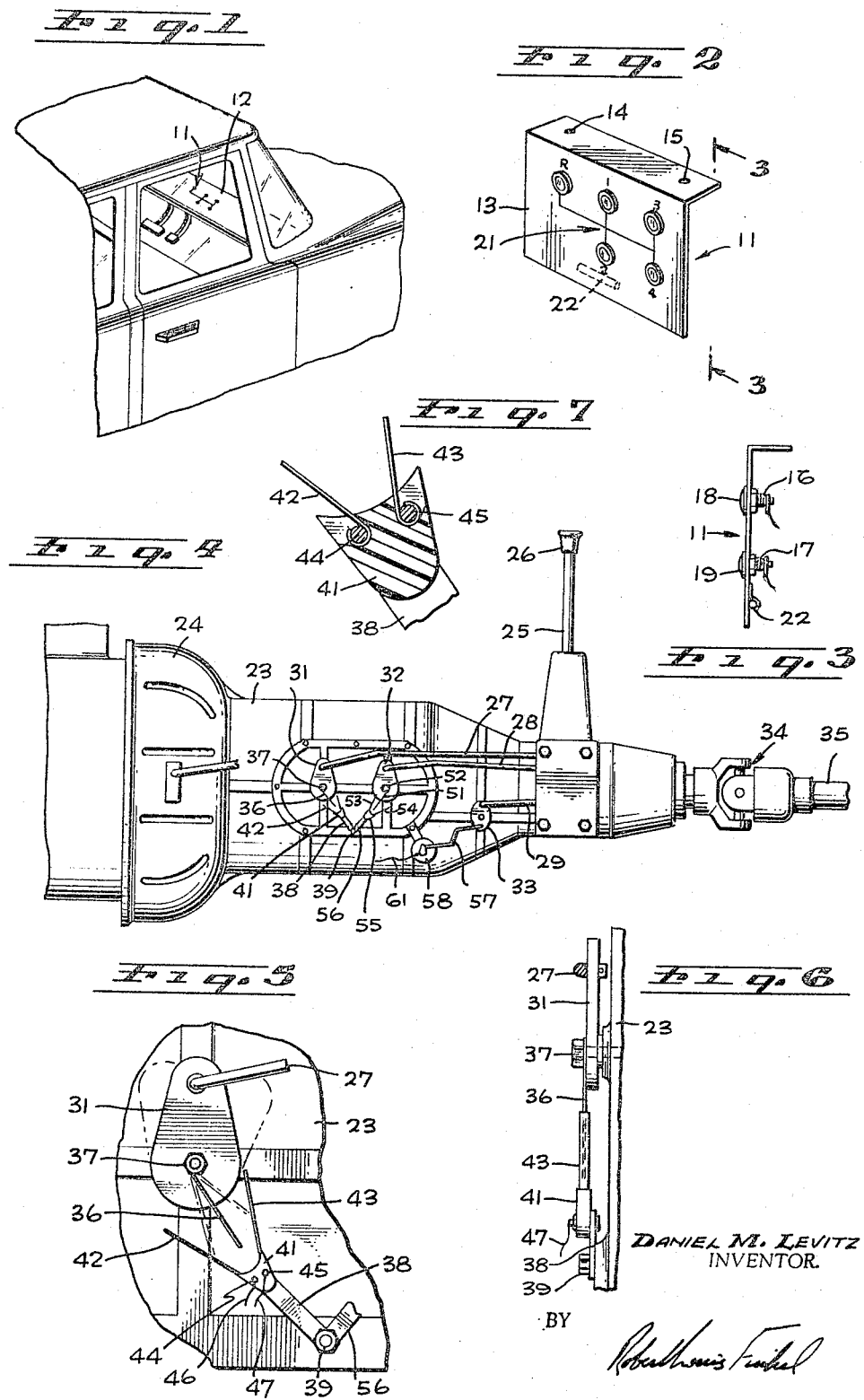

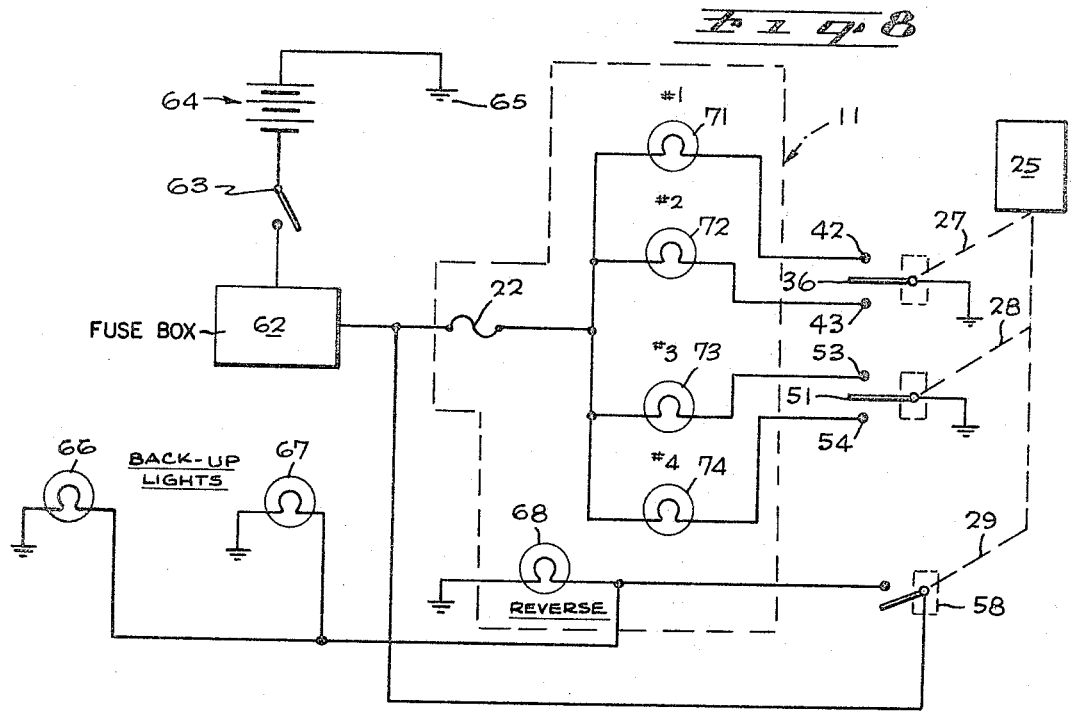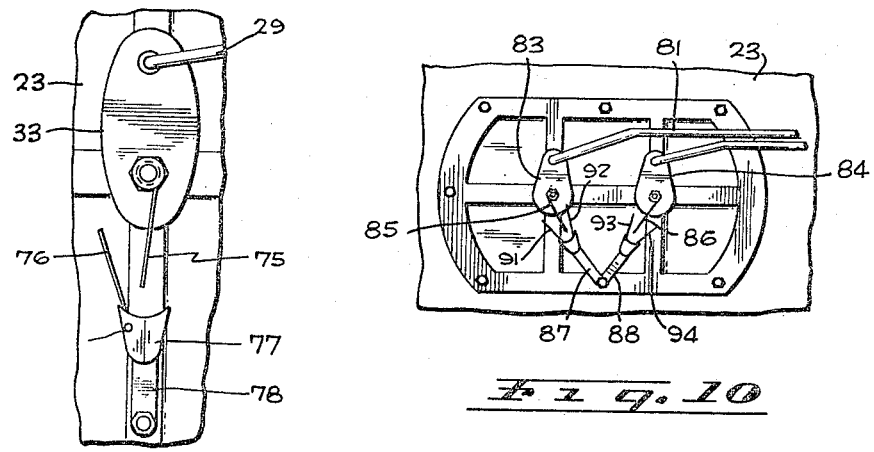

3,332,061
VEHICLE GEAR SHIFT POSITION INDICATOR
Daniel M. Levitz, 12630 Hatteras,
North Hollywood, Calif. 91607
Filed Oct. 30, 1964, Ser. No. 407,717
6 Claims. (Cl. 340—80)

This invention relates to a vehicle gear shift position indicator and more particularly to a display of indicating lights adapted to be mounted on an instrument panel or the dashboard of an automobile with a plurality of lights representing the four forward speeds and reverse to indicate the position of the gear shift lever in a manually operated transmission.

Many automobiles having automatic transmissions are equipped with illuminated indicators for visually indicating the position of the gear or drive selectors. In cars having transmission operating levers mounted on the steering column or on a console, these indicators are generally connected directly to the operating lever; while in those employing push buttons for operating automatic transmissions they take the form of lights activated by or illuminating the push buttons themselves. The manually operated, or floor stick shift type of transmission, however, has not previously been equipped with any means visible at night or in the dark for indicating the position of the gear shift lever and showing what gears are engaged.

Briefly stated, one preferred embodiment of the present invention consists essentially of a display panel with a plurality of indicating lights arranged in the same pattern as the different positions of the gear shift lever.

The lights representing the three or four forward speeds have one pole directly connected to the fuse box and through the ignition switch to the car battery. A pair of insulated contacts are mounted adjacent each of the two shifting levers on the transmission, which are actuated in shifting from first to second and from third to fourth gear, respectively. These contacts are positioned to engage a contact mounted on each of the operating levers for grounding the circuit connected to the particular light bulb indicating the corresponding gear position. In vehicles having a separate switch for actuating backup lights when the gear shift lever is moved to engage the transmission in reverse, the live contact from this switch is connected to ground through the light on the panel indicating reverse.

If desired, different colored lights may be used for the reverse and forward positions to avoid possible confusion and facilitate rapid visual discrimination.

By virtue of its simplicity the present invention may readily be installed in any automobile having a manual gear shift by attaching the contacts to the transmission, mounting the light display in the instrument panel or on top of the dashboard, where it is readily visible to the operator, and then connecting the lights to leads from the insulated switch contacts. The visual display provided by the subject invention is of obvious advantage to beginning drivers, as well as to more experienced drivers who desire a constant positive indication to confirm the particular gear position.

One object of the present invention is to provide an indicating panel representing the gear position of a manually operated gear shift type of transmission which may be readily installed in a production automobile without requiring expensive modification or any internal reconstruction of the transmission.

Other objects and many of the attendant advantages of this invention will be readily appreciated as the same becomes better understood by reference to the following detailed description when considered in connection with the accompanying drawings wherein:

FIGURE 1 is a fragmentary perspective view of a portion of an automobile with the indicator panel of the present invention mounted on the dashboard in clear view of the operator;

FIGURE 2 is a pictorial view of the indicator panel on an enlarged scale;

FIGURE 3 is a sectional view through the indicator panel taken on the lines 3—3 of FIGURE 2;

FIGURE 4 is a side elevational view of the transmission and bell housing of an automobile equipped with a four speed, floor mounted gear shift illustrating one preferred embodiment of the switch mechanism of the present invention for actuating the indicator lights on the panel of FIGURES 1 through 3;

FIGURE 5 is a detailed fragmentary view on an enlarged scale illustrating one of the gear actuating levers with the switch contact mechanism of the present invention attached;

FIGURE 6 is a fragmentary end elevation view of the switch mechanism illustrated in FIGURE 5;

FIGURE 7 is a sectional view on a further enlarged scale illustrating a preferred method for mounting the whisker contacts on the insulated block of the switch contact mechanism shown in FIGURES 5 and 6;

FIGURE 8 is a schematic circuit diagram illustrating one preferred arrangement of the electrical circuit for energizing the light bulbs on the indicator panel of FIGURES 1 through 3 by means of the contacts shown in FIGURES 4 through 7;

FIGURE 9 is an enlarged detailed, fragmentary view of an alternate reverse switch mechanism;

FIGURE 10 is an enlarged fragmentary view of a contact arrangement for a transmission with only three forward gears and reverse.

Referring now to the drawings in detail and more particularly to FIGURES 1 through 3, a portion of an automobile is shown in FIGURE 1 with an indicator light panel 11 mounted on the dashboard 12.

As shown in FIGURES 2 and 3, the indicator panel 11 may consist of a sheet metal or plastic bracket 13 provided with a pair of holes 14 and 15 for rigidly mounting the bracket on the dashboard 12.

A plurality of indicator lights are mounted in light sockets such as those shown at 16 and 18 in FIGURE 3 and are provided with lenses such as those indicated at 18 and 19 in FIGURE 3 to provide a display as illustrated in FIGURES 1 and 2 and indicated by the arrow 21. Numerals 1, 2, 3 and 4 represent the four forward speeds and the letter R represents reverse in the same pattern or arrangement as the gear shift positions. A fuse 22 is mounted on the back of the panel or bracket 13 for protecting the light bulbs and wiring from an overload. If desired, the individual light bulbs, sockets and lenses may each be mounted separately in small openings through the dashboard in the same arrangement as illustrated.

As shown in FIGURE 4, a conventional transmission 23 connected to a bell housing 24 is provided with a gear shift lever 25 having a knob 26 mounted on the rear part of the transmission housing 23. Gear shift lever 25 actuates push rods 27 and 28 for engaging the four forward speed gears and push rod 29 for engaging the reverse gears.

Push rod 27 engages lever 31 for selectively engaging the first and second gears and push rod 28 engages lever 32 for engaging the third and fourth gears. Push rod 29 engages lever 33 for engaging the reverse gears. The drive from the transmission is connected through the universal joint 34 to a drive shaft 35, and then to the differential rear end and the wheels (not shown).

As illustrated more clearly on a larger scale in the fragmentary views of FIGURES 5 and 6, lever 31, which is actuated by push rod 27 between the two positions shown in broken lines for engaging the first and second gears respectively, is provided with a resilient spring wire contact 36 which is rigidly mounted on lever 31 by means of nut 37 with the circular end of the spring wire 36 preferably mounted between the nut 37 and the lever 31, as illustrated in FIGURE 6.

In accordance with the present invention, an arm 38 is mounted on the transmission housing 23 by means of a bolt 39 and is provided with an insulating block 41 on which two whisker contacts 42 and 43 are mounted in a V arrangement by means of two bolts and nuts 44 and 45 which also serve for connection of lead wires 46 and 47.

It will be apparent that the resilient spring contacts 42 and 43 are arranged to be contacted by the spring wire contact 36, whenever lever 31 is moved into the position for engaging the first and second gears respectively, as illustrated by the broken line positions of lever 31 and contact 36.

A similar arrangement is provided on lever 32 with a spring wire contact 51 mounted by means of the nut 52 to engage either of the resilient whisker contacts 53 and 54 which are mounted on an insulating block 55 with arm 56 secured to the transmission housing by bolt 39, which also secures arm 38.

The positions of spring wire contacts 36 and 51 and of the two arms 38 and 56 may be adjusted to provide for the engagement of spring contacts 42, 43, 53 and 54 with the appropriate spring wire contact when the first, second, third and fourth gears respectively are engaged by the movement of the gear shift lever 25.

When the gear shift lever 25 is moved into the reverse position, movement of the connected push rod 29 activates lever 33, causing lever 57 to actuate switch 58 mounted on a bracket or arm 59. This energizes a circuit through lead wire 61, which is normally used to illuminate the backup lights.

As illustrated in the schematic circuit diagram of FIGURE 8, the fuse box 62 customarily provided on the automobile is connected through the ignition switch 63 to the battery 64 which has one side connected to ground at 65.

The fuse box 62 would normally be connected through the reverse switch 58 to the backup lights 66 and 67, which are connected to ground as shown.

In accordance with the present invention, the reverse switch 58 is also connected through a light bulb 68 mounted in the indicator panel 11 in the reverse position indicated by the R and is connected to ground, so that the light bulb will be illuminated when the reverse switch 58 is closed.

The other light bulbs 71, 72, 73 and 74 in the gear shift indicator panel 11 each have one pole connected through fuse 22 to the fuse box 62, and when lighted indicate that first, second, third or fourth gears is engaged.

The other leads or poles of light bulbs 71 and 72 are connected to spring contacts 42 and 43 respectively, which are selectively engaged by spring wire contact 36 mounted on lever 31 by nut 37 and are connected to ground through the transmission housing 23 as indicated.

The other two light bulbs 73 and 74 are connected to the contacts 53 and 54 respectively, which are selectively engaged by the spring wire contact 51. This spring wire contact 51 is also connected to ground through its mounting, nut 52, and lever 32, which is electrically connected to the grounded transmission housing 23.

If the automobile is not equipped with a separate switch 58 for the backup lights, another spring wire contact 75 may be mounted on the reverse actuating lever 33, as shown in FIGURE 9, to engage a spring contact 76 mounted on insulating block 77 and arm 78. Contact 76 would then be connected through light bulb 68 to fuse 22, since lever 33 is grounded to the transmission housing 23.

Obviously the basic concept of the present invention may also be utilized in conjunction with a manually operated transmission having three forward speeds and reverse, as shown in FIGURE 10. In this configuration the gear shift lever actuates two push rods 81 and 82 with one push rod 81 selectively engaging reverse or first gear by actuating lever 83, and the other push rod 82 selectively engaging second and third gears by actuating lever 84.

Levers 83 and 84 are provided with spring wire contacts 85 and 86 respectively, and arms 87 and 88 hold the spring contacts 91, 92, 93 and 94, which are connected to indicator lights for reverse, first, second and third gears respectively. The structural arrangement and wiring would be similar to that shown in FIGURES 1 through 8.

Although the present invention is particularly intended for use with transmissions employing a floor mounted "stick-shift," it may also be utilized with other types of transmissions, such as those having a column shift or the like.

Other variations of the present invention may be made within the scope of the following claims.

What is claimed is:

1. In a gear shift position indicator for automobiles having a manually operated transmission with a gear shift lever actuating a plurality of levers mounted externally on the transmission housing for selectively actuating the forward and reverse gears by means of push rods connected between said levers and said gear shift lever, the improvement comprising:
   (a) an indicator panel having a plurality of light bulbs indicating the different forward speeds and reverse, respectively;
   (b) a spring contact rigidly mounted on certain of the said gear actuating levers; and
   (c) a plurality of resilient contacts mounted on said transmission housing and extending adjacent certain of said spring contacts on opposite sides thereof for engagement thereby when said gear actuating levers are in a gear engaging position, each of said contacts being electrically connected to energize the light bulb on said indicator panel corresponding to the position of the gear shift lever.

2. In a gear shift position indicator for automobiles having a manually operated transmission with a gear shift lever actuating a plurality of levers mounted externally on the transmission housing for selectively actuating the forward and reverse gears by means of push rods connected between said levers and said gear shift lever, the improvement comprising:
   (a) an indicator panel having a plurality of light bulbs indicating the different forward speeds and reverse, respectively;
   (b) an electrically grounded spring contact rigidly mounted on certain of the said gear actuating levers; and
   (c) a plurality of arms mounted on said transmission housing adjacent said gear actuating levers, each of said arms having an insulating block mounted thereon and a pair of resilient contacts mounted on said insulating block and extending divergently on opposite sides of one of said spring contacts on said gear actuating levers for engagement thereby when said gear actuating levers are in a gear engaging position, each of said resilient contacts being in electrical connection with the light bulb on said indicator panel corresponding to the position of the gear shift lever.

3. In a gear shift position indicator for automobiles having a manually operated transmission with a gear shift lever actuating a plurality of levers mounted externally on the transmission housing for selectively actuating the forward and reverse gears by means of push rods connected between said levers and said gear shift lever, the improvement comprising:
  (a) an indicator panel having a plurality of light bulbs indicating the different forward speeds and reverse, respectively;
  (b) an electrically grounded spring contact rigidly mounted on each of the said forward gear actuating levers; and
  (c) a plurality of arms mounted on said transmission housing adjacent said forward gear actuating levers, each of said arms having an insulating block mounted thereon and a pair of resilient contacts mounted on said insulating block and extending divergently on opposite sides of one of said spring contacts on said gear actuating levers for engagement thereby when said gear actuating levers are in a gear engaging position, each of said resilient contacts being in electrical connection with one of the light bulbs on said indicator panel.

4. In a gear shift position indicator for automobiles having a manually operated transmission with a gear shift lever actuating a plurality of levers mounted externally on the transmission housing for selectively actuating the forward and reverse gears by means of push rods connected between said levers and said gear shift lever, the improvement comprising:
  (a) an indicator panel having a plurality of light bulbs indicating the different forward gears and reverse, respectively;
  (b) an electrically grounded spring contact rigidly mounted on each of the said forward gear actuating levers;
  (c) a plurality of arms mounted on said transmission housing adjacent said forward gear actuating levers, each of said arms having an insulating block mounted thereon and a pair of resilient contacts mounted on said insulating block and extending divergently on opposite sides of one of said spring contacts on said gear actuating levers for engagement thereby when said gear actuating levers are in a gear engaging position, each of said resilient contacts being in electrical connection with one of the light bulbs on said indicator panel indicating a forward gear; and
  (d) switch means mounted adjacent the said reverse gear actuating lever and operatively associated therewith, said switch means being in electrical connection with another of said light bulbs indicating reverse gear.

5. A gear shift position indicator for automobiles having a manually operated transmission with a gear shift lever actuating a plurality of levers mounted externally on the transmission housing for selectively actuating the forward and reverse gears by means of push rods connected between said levers and said gear shift lever, the improvement comprising:
  (a) an indicator panel having a plurality of light bulbs indicating the different forward gears and reverse, respectively, said light bulbs being electrically connected to the automobile battery;
  (b) an electrically grounded spring contact rigidly mounted on certain of the said gear actuating levers; and
  (c) a plurality of arms mounted on said transmission housing adjacent said gear actuating levers, each of said arms having an insulating block mounted thereon and a pair of resilient whisker contacts mounted on said insulating block and extending divergently on opposite sides of one of said spring contacts on said gear actuating levers for engagement thereby when said gear actuating levers are in a gear engaging position, each of said resilient contacts being in electrical connection with one of the light bulbs on said indicator panel.

6. A gear shift position indicator for automobiles having a manually operated transmission with a gear shift lever actuating a plurality of gear actuating levers mounted externally on the transmission housing for selectively actuating the forward and reverse gears by means of push rods connected between said levers and said gear shift lever, the improvement comprising:
  (a) an indicator panel having a plurality of light bulbs indicating the different forward gears and reverse, respectively, said light bulbs being electrically connected to the automobile battery;
  (b) an electrically grounded spring contact rigidly mounted on each of the said gear actuating levers; and
  (c) a pair of arms mounted on said transmission housing adjacent said gear actuating levers, each of said arms having an insulating block mounted thereon and a pair of resilient contacts mounted on said insulating block and extending divergently on opposite sides of one of said spring contacts on said gear actuating levers for engagement thereby when said gear actuating lever is in a gear engaging position, one pair of said resilient contacts adjacent one of said levers being in electrical connection with a pair of light bulbs on said indicator panel indicating reverse and first gears respectively, and the other pair of said resilient contacts adjacent the second of said levers being in electrical connection with a pair of light bulbs on said indicator panel for indicating second and third gears respectively.

References Cited
UNITED STATES PATENTS 2,005,483  6/1935  Sucky et al.
2,060,705  11/1936  Velo.

NEIL C. READ, *Primary Examiner.*

A. H. WARING, *Assistant Examiner.*